(12) United States Patent
Zappaterra et al.

(10) Patent No.: US 11,046,202 B2
(45) Date of Patent: Jun. 29, 2021

(54) POWER SUPPLY AND RECHARGING ASSEMBLY AND METHOD FOR AN ELECTRIC VEHICLE, AND ELECTRIC VEHICLE COMPRISING THE POWER SUPPLY AND RECHARGING ASSEMBLY

(71) Applicant: IVECO S.p.A., Turin (IT)

(72) Inventors: Massimo Zappaterra, Genoa (IT); Cristian Bertolotto, Levanto (IT); Giorgio Mantovani, Genoa (IT); Alessandro Bernardini, Genoa (IT)

(73) Assignee: IVECO S.P.A., Turin (IT)

( * ) Notice: Subject to any disclaimer, the term of this patent is extended or adjusted under 35 U.S.C. 154(b) by 15 days.

(21) Appl. No.: 16/749,676

(22) Filed: Jan. 22, 2020

(65) Prior Publication Data
US 2020/0262302 A1    Aug. 20, 2020

(30) Foreign Application Priority Data

Jan. 24, 2019 (IT) .......................... 102019000001099

(51) Int. Cl.
| B60L 53/00 | (2019.01) |
| B60L 53/30 | (2019.01) |
| B60L 53/53 | (2019.01) |
| B60L 53/16 | (2019.01) |

(52) U.S. Cl.
CPC .............. B60L 53/30 (2019.02); B60L 53/16 (2019.02); B60L 53/53 (2019.02)

(58) Field of Classification Search
CPC .......... B60L 53/16; B60L 53/53; B60L 53/30; B60L 53/11; B60L 58/19; B60L 58/21; Y02T 90/12; Y02T 90/14; Y02T 10/7072; Y02T 10/70; H02J 2310/48; H02J 7/0024
See application file for complete search history.

(56) References Cited

U.S. PATENT DOCUMENTS

| 6,664,762 B2 * | 12/2003 | Kutkut ...................... H02J 7/02 320/116 |
| 10,363,828 B1 * | 7/2019 | Shen ......................... B60L 1/14 |
| 10,369,896 B2 * | 8/2019 | Namuduri ............... B60L 53/11 |
| 10,432,130 B2 * | 10/2019 | Namuduri ............... B60L 53/22 |

(Continued)

FOREIGN PATENT DOCUMENTS

| JP | 2013038910 | 2/2013 |
| WO | WO2018096341 | 5/2018 |

OTHER PUBLICATIONS

Italian Search Report for Italian Application No. IT201900001099, dated Aug. 21, 2019, 9 pages.

*Primary Examiner* — Naum Levin
(74) *Attorney, Agent, or Firm* — McCracken & Gillen LLC (57) ABSTRACT

A recharging method and assembly to charge an electric vehicle comprising a battery pack including a plurality of storage batteries having a same nominal charge voltage, the battery pack being connectable to a recharging station adapted to provide a recharging voltage, which is greater than said nominal charge voltage. In a recharging mode, in which the recharging voltage deliverable by the recharging station is equal to or greater than the sum of the nominal charge voltages of the plurality of storage batteries, the storage batteries are connected in series to one another, so as to recharge the series of batteries with a recharging voltage greater than the nominal charge voltage.

10 Claims, 4 Drawing Sheets

(56) References Cited

U.S. PATENT DOCUMENTS

| | | | |
|---|---|---|---|
| 10,773,604 B2* | 9/2020 | Meitinger | H01M 10/441 |
| 10,821,836 B2* | 11/2020 | Schmid | B60L 11/1855 |
| 10,919,467 B2* | 2/2021 | Link | B60L 50/51 |
| 2018/0105060 A1 | 4/2018 | McQuillen et al. | |
| 2019/0070971 A1* | 3/2019 | Kusumi | B60L 53/60 |
| 2019/0229541 A1* | 7/2019 | Ono | H02J 7/0024 |
| 2019/0232814 A1* | 8/2019 | Epler | H01M 10/482 |
| 2019/0283625 A1* | 9/2019 | Eriksson | H02J 7/0014 |
| 2019/0288528 A1* | 9/2019 | Greetham | H02J 7/0024 |
| 2019/0341787 A1* | 11/2019 | Stra Er | H02J 7/0024 |
| 2020/0070667 A1* | 3/2020 | Wang | B60L 50/51 |
| 2020/0180453 A1* | 6/2020 | Pfeilschifter | H02M 1/4208 |

* cited by examiner

POWER SUPPLY AND RECHARGING ASSEMBLY AND METHOD FOR AN ELECTRIC VEHICLE, AND ELECTRIC VEHICLE COMPRISING THE POWER SUPPLY AND RECHARGING ASSEMBLY

CROSS-REFERENCE TO RELATED APPLICATIONS

This patent application claims priority from Italian patent application no. 102019000001099 filed on Jan. 24, 2019, the entire disclosure of which is incorporated herein by reference.

STATEMENT RE: FEDERALLY SPONSORED RESEARCH/DEVELOPMENT

Not Applicable

TECHNICAL FIELD

The invention relates to a power supply and recharging assembly and method for an electric vehicle and to an electric vehicle comprising the power supply and recharging assembly.

KNOWN STATE OF THE ART

As it is known, in an electric vehicle (EV), an electric motor is the only source of energy used to drive the vehicle; in a hybrid vehicle, the electric motor is an auxiliary source of energy added to the internal combustion engine.

In an electric vehicle, the energy powering the electric motor is typically stored in one or more storage batteries or batteries. When the energy stored in the batteries decreases, they can be charged by connecting to vehicle to an external power supply source. Recharging stations (also known as "Electric Vehicle Supply Equipment"—EVSE), which are used to this purpose, act as interfaces between the vehicle and a power supply network, in order to supply a charging or recharging current to the batteries. Known recharging stations are configured to deliver recharging powers whose maximum value depends on the voltage and current supported both by the recharging stations themselves and by the electrical components used to provide the service (cables, contacts, etc.). More in particular, the maximum deliverable voltage depends on the features, performances and/or building specifications of the recharging station taken into account and on the maximum voltage supported by the batteries of the electric vehicle being charged.

Currently, recharging stations are available, which are enabled to provide voltages up to 1000 V (high-power recharging stations—HPC EVSE) and ensure small charging times. However, in order to fully exploit the voltage provided by these stations, the batteries mounted on board the vehicle must be designed to support voltages with a corresponding value. Batteries capable of supporting recharging voltages up to 800 V are available in the market, but are very expensive and, therefore, are not widely spread.

Therefore, there is a strong need to make use of high-power recharging stations, in particular capable of delivering energy at 800 V, though using, at the same time, batteries that are available in the market and are not too expensive.

The object of the invention is to fulfil the needs discussed above.

SUMMARY OF THE INVENTION

The aforesaid object is reached by means of a power supply and recharging assembly and method for an electric vehicle and of an electric vehicle comprising the power supply and recharging assembly, as set forth in the appended claims

BRIEF DESCRIPTION OF THE DRAWINGS

The invention will be best understood upon perusal of the following detailed description of a preferred embodiment, which is provided by way of non-limiting example, with reference to the accompanying drawings, wherein.

DETAILED DESCRIPTION OF THE INVENTION

Figure 1:
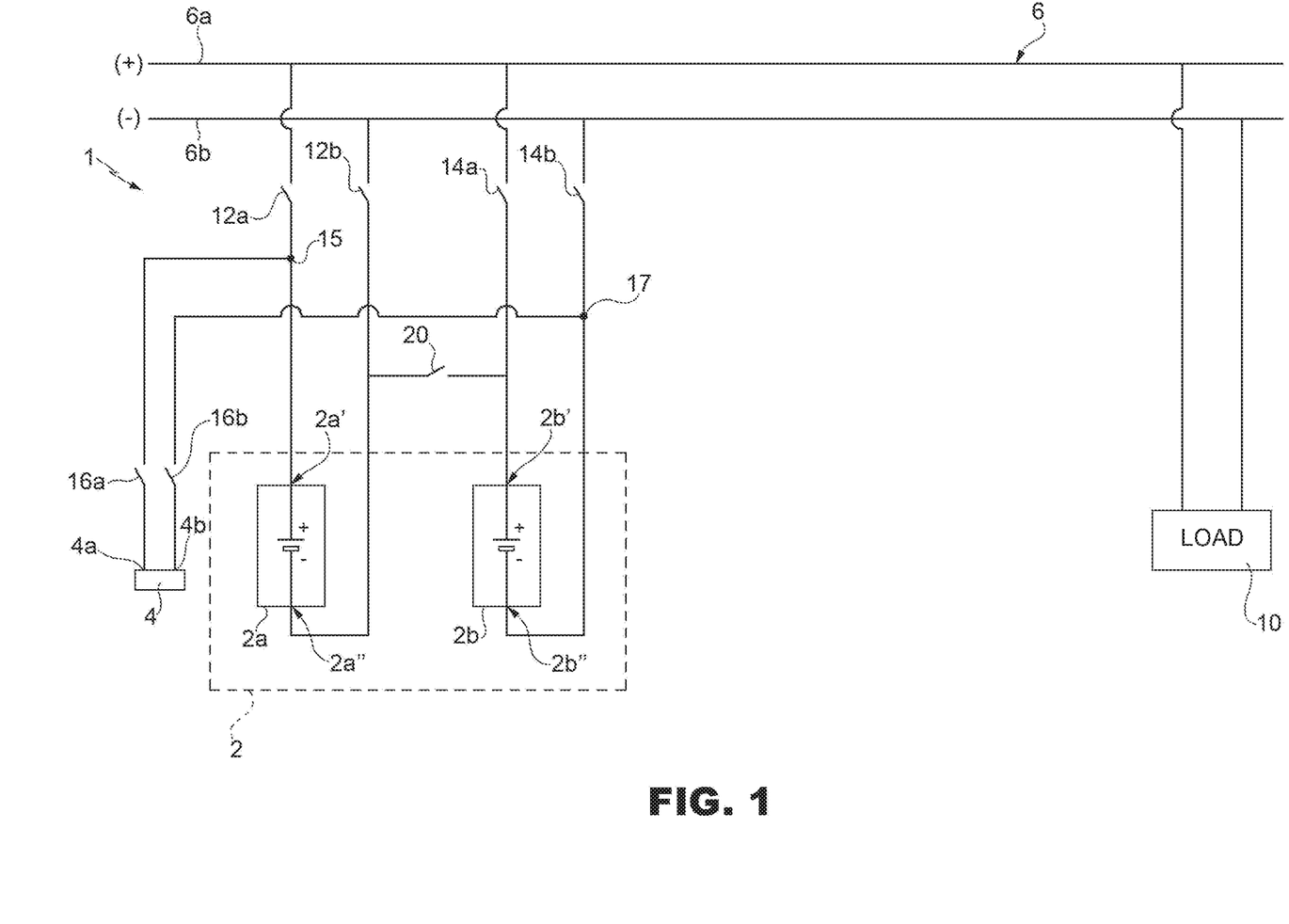
FIG. 1 shows a recharging circuit for the storage batteries of an electric vehicle according to an embodiment of the invention.
Figure 4:
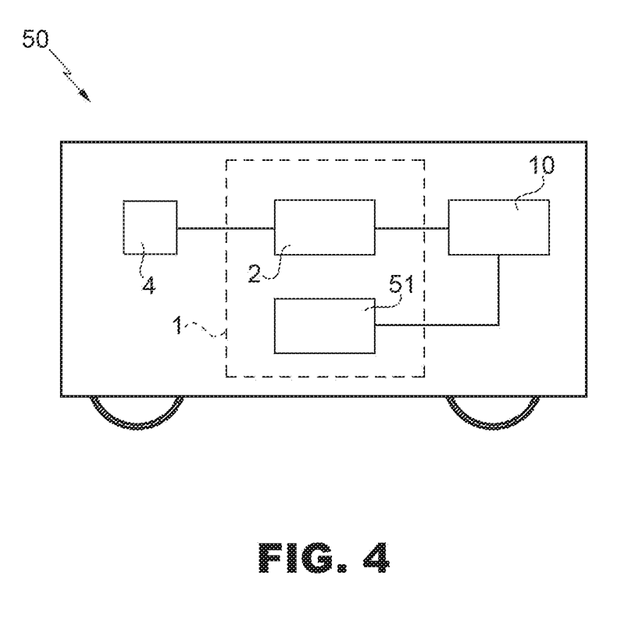
FIG. 4 schematically shows an electric vehicle provided with the recharging circuit according to any one of the embodiments of FIGS. 1-3.

FIG. 1 schematically shows a recharging circuit 1 to charge a battery pack 2 of an electric vehicle (which is schematically shown in FIG. 4). The battery pack 2 is operatively coupled to an electrical load 10 of the electric vehicle so as to supply the electric energy needed for the operation of the electrical load 10. The battery pack 2 includes a plurality of rechargeable storage batteries. A connector 4 (which is also known as "charging inlet") is fixed to the electric vehicle in a known manner and is provided with a first and a second power supply pins 4a and 4b, which are operatively coupled to the battery pack 2 and to a power bus 6 (Dc-link), which powers the electrical load 10. The power bus 6 comprises a positive voltage line (+) 6a and a negative voltage line (-) 6b.

The electrical load 10 includes, in a per se known manner which is not part of the subject-matter of the invention, at least one inverter, which is coupled to the electric motor 10 so as to generate a torque to move the vehicle. The electrical load 10 can also include further components or systems of the electric vehicle, which use, for their operation, the current flowing in the power bus 6 (for example, the air conditioning system, the lighting system, the infotainment system, etc.).

The battery pack 2 comprises, in the embodiment of FIG. 1, a first and a second storage batteries 2a, 2b, each having the same nominal charge voltage, which here, for example, is 400V. The first and the second storage batteries 2a, 2b are, for example, lithium-ion batteries or, in general, known electrochemical storage batteries.

The first storage battery 2a has a positive terminal 2a' (terminal +) coupled to the positive voltage line 6a and a negative terminal 2a" (terminal -) coupled to the negative voltage line 6b.

A switch 12a is interposed between the positive terminal 2a' (terminal +) and the positive voltage line 6a. When the switch 12a is in an open state, the positive terminal 2a' is electrically disconnected from the positive voltage line 6a; when the switch 12a is in a closed state, the positive terminal 2a' is electrically connected to the positive voltage line 6a.

A switch 12b is interposed between the negative terminal 2a" (terminal -) and the negative voltage line 6b.

When the switch 12b is in an open state, the negative terminal 2a" is electrically disconnected from the negative voltage line 6b; when the switch 12b is in a closed state, the negative terminal 2a" is electrically connected to the negative voltage line 6b.

Similarly, the second storage battery 2b has its own positive terminal 2b' (terminal +) coupled to the positive voltage line 6a and its own negative terminal 2b" (terminal −) coupled to the negative voltage line 6b.

A switch 14a is interposed between the positive terminal 2b' (terminal +) and the positive voltage line 6a. When the switch 14a is in an open state, the positive terminal 2b' is electrically disconnected from the positive voltage line 6a; when the switch 14a is in a closed state, the positive terminal 2b' is electrically connected to the positive voltage line 6a.

A switch 14b is interposed between the negative terminal 2b" (terminal −) and the negative voltage line 6b.

When the switch 14b is in an open state, the negative terminal 2b" is electrically disconnected from the negative voltage line 6b; when the switch 14b is in a closed state, the negative terminal 2b" is electrically connected to the negative voltage line 6b.

In FIG. 1, reference numeral 15 indicates an electric node between the positive terminal 2a' of the first storage battery 2a and the switch 12a (in particular, the node 15 coincides with the positive terminal 2a'). Furthermore, it is shown a further electric node 17 between the negative terminal 2b" of the second storage battery 2b and the switch 14b (in particular, the node 17 coincides with the negative terminal 2b").

The first power supply pin 4a of the charging inlet 4 is coupled, through a switch 16a, to the node 15. The second power supply pin 4b is coupled, through a switch 16b, to the node 17.

The switches 16a and 16b can be switched to an open state and to a closed state so as to electrically disconnect and connect, respectively, the power supply pins 4a, 4b from/to the nodes 15, 17.

Therefore, according to the operating diagram suggested herein, the first power supply pin 4a of the charging inlet 4 is coupled to the positive power supply line 6a by means of the switch 12a and the second power supply pin 4b of the charging inlet 4 is coupled to the negative power supply line 6b by means of the switch 14b.

According to an aspect of the invention, the negative terminal 2a" of the first storage battery 2a is coupled to the positive terminal 2b' of the second storage battery 2b by means of a switch 20. The switch 20 can be switched to an open state so as to electrically disconnect the negative terminal 2a" from the positive terminal 2b' and to a closed state so as to electrically connect the negative terminal 2a" to the positive terminal 2b'.

As explained more in detail below, the switch 20 has the function, in an operating condition which is better discussed hereinafter, of electrically connecting the first and the second storage batteries 2a, 2b to one another in series.

In a non-limiting embodiment, the switches 12a, 12b, 14a, 14b, 16a, 16b and 20 are contactors, namely electric-mechanical devices, which are not manually operated and are adapted to stand currents in high-power conditions (in this case, amounting to hundreds of Volts, in particular up to 800 V). Alternatively, the switches 12a, 12b, 14a, 14b, 16a, 16b and 20 can be solid-state devices, chosen depending on the needs.

The switches 12a, 12b, 14a, 14b, 16a, 16b and 20 are operatively coupled to an electronic control unit (shown in FIG. 4 with reference number 51), which is configured to switch the switches 12a, 12b, 14a, 14b, 16a, 16b and 20 to an open and closed state in order to implement a plurality of operating modes described hereinafter.

In detail, the electronic control unit 51 is configured to control the switches 12a, 12b, 14a, 14b, 16a, 16b and 20 so as to implement a plurality of operating modes of the recharging circuit 1, among which there are, in particular: a rest mode (or "key-off" mode), a power supply mode, a first recharging mode and a second recharging mode.

In the key-off mode, the electric vehicle is not powered by means of the battery pack 2 and, at the same time, the battery pack 2 is not being charged (for example, when the electric vehicle is parked).

In the power supply mode, the electrical load 10 is powered by means of the battery pack 2 (for example, during the drive).

In the first and the second recharging modes, the batteries are charged using different values of recharging voltage.

The electronic control unit 51 can be the electronic control unit of the electric vehicle, properly configured, via software, to implement one or more of the aforesaid operating modes (in particular, the first recharging mode and the second recharging mode); alternatively, the electronic control unit 51 can be a further additional control unit beside the electronic control unit of the electric vehicle or a generic controller, properly configured and designed to implement one or more of the aforesaid operating modes (in particular, the first recharging mode and the second recharging mode).

More in detail, in the key-off mode, the switches 12a, 12b, 14a, 14b, 16a, 16b and, optionally, the switch 20 are controlled by the electronic control unit 51 so as to switch to an open state.

The following table schematically shows the state of the aforesaid switches in the key-off mode:

| | |
|---|---|
| Switch 12a | OPEN |
| Switch 12b | OPEN |
| Switch 14a | OPEN |
| Switch 14b | OPEN |
| Switch 16a | OPEN |
| Switch 16b | OPEN |
| Switch 20 | OPEN |

Therefore, the batteries 2a and 2b are electrically disconnected both from the charging inlet 4 and from the power bus 6.

In the power supply mode, the switches 16a, 16b and 20 are controlled by the electronic control unit 51 so as to switch to an open state, whereas the switches 12a, 12b, 14a and 14b are controlled by the electronic control unit 51 so as to switch to a closed state.

The following table schematically shows the state of the aforesaid switches in the power supply mode:

| | |
|---|---|
| Switch 12a | CLOSED |
| Switch 12b | CLOSED |
| Switch 14a | CLOSED |
| Switch 14b | CLOSED |
| Switch 16a | OPEN |
| Switch 16b | OPEN |
| Switch 20 | OPEN |

As a consequence, the batteries 2a, 2b are electrically connected in parallel to the power bus 6 and the electrical load 10 is powered by means of the voltage provided by the storage batteries 2a, 2b. As already mentioned above, in this embodiment, each storage battery 2a, 2b provides the power bus 6 with a nominal voltage of approximately 400V. Furthermore, the battery pack 2 is electrically disconnected from the charging inlet 4.

In the first recharging mode, the switch 20 is controlled by the electronic control unit 51 so as to switch to an open state, whereas the switches 16a, 16b, 12a, 12b, 14a and 14b are controlled by the electronic control unit 51 so as to switch to a closed state.

The following table schematically shows the state of the aforesaid switches in the first recharging mode:

| | |
|---|---|
| Switch 12a | CLOSED |
| Switch 12b | CLOSED |
| Switch 14a | CLOSED |
| Switch 14b | CLOSED |
| Switch 16a | CLOSED |
| Switch 16b | CLOSED |
| Switch 20 | OPEN |

As a consequence, the first and the second storage batteries 2a, 2b are electrically connected to one another in parallel and are charged by means of the power supply voltage provided by the charging station through the charging inlet 4. In a known manner, during the first recharging mode, the electric vehicle communicates to the recharging station the maximum voltage limit supported by the battery pack 2, so as to protect the battery pack 2 from overvoltages. In this way, even though the known recharging station can supply voltages up to 1000V (more commonly 800V), the battery pack 2 is charged at the nominal charge voltage of the storage batteries 2a, 2b, without damages. Since the power bus 6 is powered, the electrical load 10 can be selectively disconnected from the power bus 6.

In the second recharging mode, the switches 16a, 16b and 20 are controlled by the electronic control unit 51 so as to switch to a closed state, whereas the switches 12a, 12b, 14a and 14b are controlled by the electronic control unit 51 so as to switch to an open state.

The following table schematically shows the state of the aforesaid switches in the second recharging mode:

| | |
|---|---|
| Switch 12a | OPEN |
| Switch 12b | OPEN |
| Switch 14a | OPEN |
| Switch 14b | OPEN |
| Switch 16a | CLOSED |
| Switch 16b | CLOSED |
| Switch 20 | CLOSED |

As a consequence, the first and the second storage batteries 2a, 2b are electrically connected to one another in series and are charged by means of the power supply voltage provided by the charging station through the charging inlet 4.

During the first and the second recharging modes, the electric vehicle communicates to the recharging station, through the battery management system—BMS, the maximum voltage supported by the battery pack 2. The BMS communicates with the recharging station through high-level communication (e.g. PLC or WiFi or another communication mode), according to the IEC61851 and ISO 15118 standards. The BMS is also interfaced with the electronic control unit 51 and serves as communication interface between the latter and the recharging station.

As an alternative or in addition to the BMS, the VMU can carry out this interface function.

Since the storage batteries 2a, 2b are electrically connected to one another in series, the maximum voltage supported by the battery pack 2, in the second recharging mode, is greater than each one of the nominal voltages of the storage batteries 2a, 2b; in particular, the maximum voltage supported by the battery pack 2 is the result of the sum of the nominal charge voltages of the storage batteries 2a, 2b (hence, in this example, the maximum voltage supported by the battery pack 2 is 800V). In this way, the potentialities of the recharging station (for instance, power delivered) can be exploited to the utmost, charging the battery pack 2 at a voltage that is greater than the one of the recharging mode described above, thus reducing charging times.

Based on the information received from the BMS, depending on the voltage that can be delivered by the recharging station, the electronic control unit 51 controls the state of the switches 12a, 12b, 14a, 14b, 16a, 16b and 20, implementing one of the recharging modes of the battery pack 2 described above based on the electric features of the recharging station with which the recharging circuit 1 is interfaced. For example, the switches are controlled in accordance with the first recharging mode (batteries 2a, 2b in parallel) in order to charge the batteries 2a, 2b at 400V when the recharging station supports a maximum voltage of 400V, or in accordance with the second recharging mode (batteries 2a, 2b in series) in order to charge them at 800V when the recharging station supports a maximum voltage of 800V.

Figure 2:
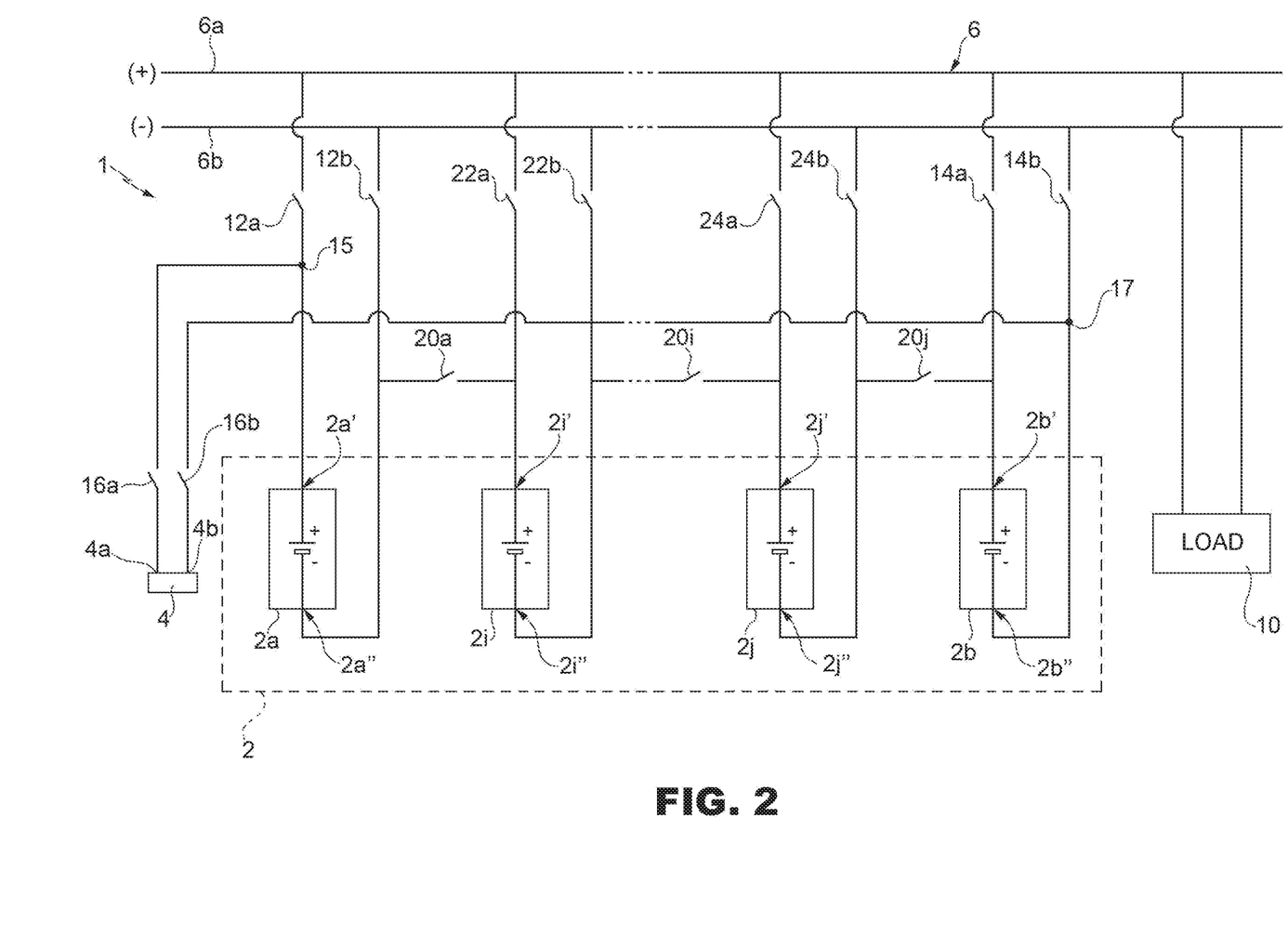
FIGS. 2 and 3 show respective recharging circuits for the storage batteries of an electric vehicle according to further embodiments of the invention.

According to a further embodiment, which is shown in FIG. 2, the battery pack 2 comprises a plurality of storage batteries 2a, 2b, . . . , 2i, 2j. The elements of FIG. 2 that are the same as the ones of FIG. 1 are not further discussed and are indicated with the same reference numbers.

The nominal charge voltage of the storage batteries 2a-2j is chosen during the design phase based on the maximum voltage that can be delivered by the existing recharging stations and on the number of storage batteries to be installed on board the vehicle. In particular, the storage batteries 2a-2j have a same nominal charge voltage, which is chosen in such a way that the sum of the nominal charge voltages of the storage batteries 2a-2j (namely, the charge voltage at the ends of the battery pack 2 when the storage batteries 2a-2j are arranged in series with one another) is equal to or smaller than the voltage that can be delivered by the recharging station. In the diagram of FIG. 2, assuming—by way of example—that there is a total number of storage batteries 2a-2j of four and that the maximum voltage that can be delivered by the recharging station is 800V, each storage battery 2a-2j is chosen so as to have a nominal charge voltage of 200V.

In order to create the electric series connection of the storage batteries 2a-2j, there are switches 20a, 20i and 20j that electrically connect the opposite terminals of successive storage batteries of the electric series, similarly to what described above with reference to the switch 20, so as to obtain a series connection of all the storage batteries 2a-2j of the battery pack 2.

Furthermore, the switches 22a, 22b, 24a and 24b are shown, which have a function that is similar to the one described in FIG. 1 with reference to the switches 12a, 12b, 14a and 14b, respectively.

As a consequence, when the storage batteries 2a-2j are charged in accordance with the second recharging mode described above, the storage batteries 2a-2j are arranged in series with one another closing the switches 20a, . . . , 20i, 20j; therefore, they can be charged exploiting the maximum voltage delivered by the recharging station.

Figure 3:
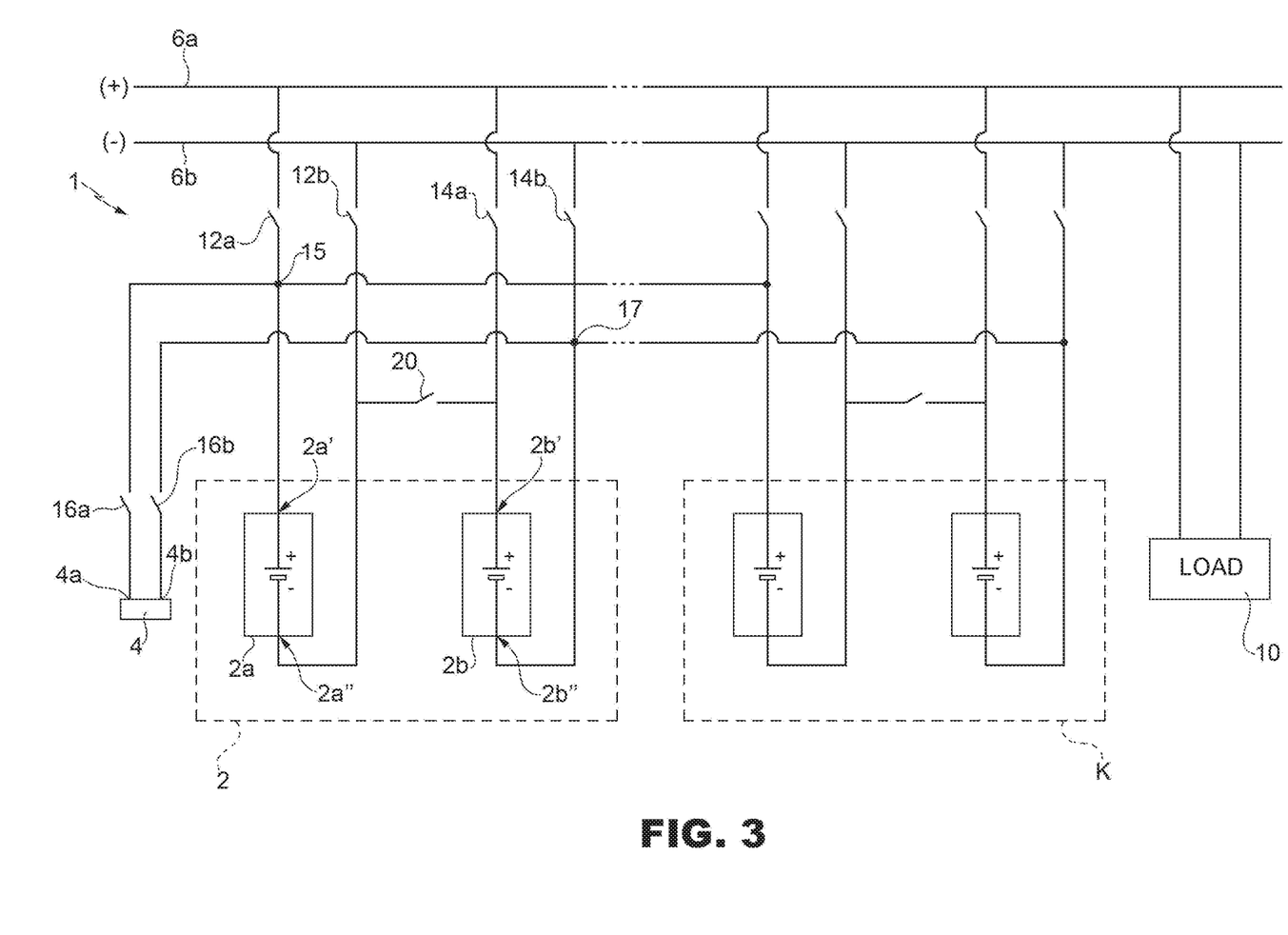

According to a further embodiment, which is shown in FIG. 3, the battery pack 2 of FIG. 1 is repeated k times. Therefore, with reference to FIG. 3, there are a plurality k of battery packs 2, . . . , k, with k being chosen based on the needs during the design phase. Each battery pack 2-k comprises a number of storage batteries chosen depending on what already discussed above with reference to FIGS. 1 and 2. The battery packs 2-k are electrically connected to the power bus 6 in parallel to one another and charged at the same time.

FIG. 4 schematically shows an electric vehicle 50 including: the charging inlet 4; the recharging circuit 1; the battery pack 2 (or a plurality of battery packs 2-k); the electronic control unit 51; and the electrical load 10. The electronic control unit 51, as already mentioned above, is operatively coupled to the switches 12a, 12b, 14a, 14b, 16a, 16b so as to implement the operating modes discussed above and, furthermore, is operatively coupled to the electrical load 10, for example in order to inhibit the drive of the electric vehicle stopping the operation of the electric motor during the first recharging mode; however, during the first recharging mode, the electronic control unit 51 can be configured to enable the operation of the air conditioning system and/or of the lighting system or of other systems or components of the electric vehicle other than the motor.

Owing to the above, the advantages of the subject-matter of the invention are evident.

In particular, the invention allows for a reduction of the time needed to charge the battery pack of the electric vehicle, with the possibility of adjusting to the features and performances of different recharging stations with which the electric vehicle can be interfaced during the use, using low-cost components. In particular, it is possible to use batteries with a nominal charge voltage of a few or some hundreds of Volts (for example, up to 400V), which can easily be found in the market and are relatively cheap, and, at the same time, it is possible to fully exploit the power that can be delivered by high-power recharging stations (HPC EVSE), which are designed to supply power with voltages up to 800-1000V.

Finally, the subject-matter of the invention can be subjected to changes and variants, which, though, do not go beyond the scope of protection set forth in the appended claims.

For example, one or more of the switches 12a, 12b, 14a, 14b, 16a, 16b and 20 can be arranged in a different way than the one shown in the figures, provided that they implement, when they are controlled accordingly, the operating modes provided for by the invention (in particular, the shift from the first to the second recharging mode depending on the voltage than can be delivered by the recharging station).

What is claimed is:

1. A method of recharging an electric vehicle (50) through a power supply and recharging assembly, the vehicle comprising a battery pack (2) including a plurality of storage batteries (2a, 2b, . . . , 2i, 2j) having a same nominal charge voltage, the battery pack (2) being connectable to a recharging station adapted to provide a recharging voltage, the method comprising the steps of:
in a first recharging mode of the battery pack, in which the recharging voltage supplied by the recharging station is equal to said nominal charge voltage of the storage batteries, electrically connecting the storage batteries to the recharging station in parallel with each other, so as to recharge each storage battery with a recharging voltage equal to the nominal charge voltage; and
in a second recharging mode of the battery pack, in which the recharging voltage supplied by the recharging station is equal to sum of the nominal charge voltages of the plurality of storage batteries, electrically connecting the storage batteries in series to each other, so as to recharge the series of storage batteries with a recharging voltage equal to sum of the nominal charge voltages,
wherein said plurality of storage batteries includes a first and a second storage battery (2a, 2b) having said nominal charge voltage and each provided with a positive terminal (2a', 2b') and a negative terminal (2a", 2b");
and wherein the power supply and recharging assembly further includes:
first switching means comprising: a first switch (12a) coupled between the positive terminal (2a') of the first storage battery (2a) and a positive voltage line (6a); a second switch (12b) connected between the negative terminal (2a") of the first storage battery (2a) and a negative voltage line (6b); a third switch (14a) coupled between the positive terminal (2b') of the second storage battery (2b) and the positive voltage line (6a); and a fourth switch (14b) coupled between the negative terminal (2b") of the second storage battery (2b) and a negative voltage line (6b);
second switching means comprising: a fifth switch (16a) coupled between the first power supply terminal (4a) and the positive terminal (2a') of the first storage battery (2a) and also coupled to the positive voltage line (6a) via said first switch (12a); and a sixth switch (16b) coupled between the second power supply terminal (4b) and the negative terminal (2b") of the second storage battery (2b) and further coupled to the negative voltage line (6b); and
third switching means comprising: a series switch (20) coupled between the negative terminal (2a") of the first storage battery (2a) and the positive terminal (2b') of the second storage battery (2b),
the method further comprising:
in the first recharging mode of the battery pack (2), controlling in conduction the first, the second, the third, the fourth, the fifth and the sixth switches (12a-16b), and controlling in interdiction said series switch (20), to recharge the first and second storage batteries with a recharging voltage equal to the nominal charge voltage;
and, in the second recharging mode of the battery pack, controlling in interdiction the first, the second, the third and the fourth switches (12a-14b), and controlling in conduction said fifth and sixth switches (16a, 16b) and said series switch (20), so as to recharge the series of storage batteries with a recharging voltage higher than the nominal charge voltage.

2. A battery-powered electric vehicle (50), including a power supply and recharging assembly according to claim 1.

3. The electric vehicle (50) according to claim 2, further comprising an electrical load (10) electrically connected to the power supply and recharging assembly to receive a supply voltage from the battery pack (2).

4. A power supply and recharging assembly for an electric vehicle (50), comprising:
a battery pack (2) including a plurality of storage batteries (2a, 2b, . . . , 2i, 2j) having a nominal charge voltage, the battery pack (2) being connectable to a recharging station adapted to provide a recharging voltage;
a power bus (6) including a positive voltage line (6a) and a negative voltage line (6b); and a connector (4), fixed to the electric vehicle, having a first and a second power supply terminal (4a, 4b) that are operatively coupled to the battery pack and to the power bus, configured to be connected to a recharging station that is adapted to supply said connector (4) with a recharging voltage;

the storage batteries of said plurality of storage batteries being coupled to the power bus, in a parallel electrical configuration, via first switching means (12a, 12b, 14a, 14b);

the storage batteries and the power bus being further coupled to the connector (4) via second switching means (16a, 16b); and the storage batteries being further coupled in series with each other via a third switching means (20), wherein, in a first recharging mode of the battery pack, in which the recharging voltage supplied by the recharging station is equal to said nominal charge voltage of the storage batteries, the first, the second and the third switching means are controllable to electrically connect said storage batteries in parallel with each other, so as to recharge each storage battery with a recharging voltage equal to the nominal charge voltage; and in a second recharging mode of the battery pack, in which the recharging voltage supplied by the recharging station is equal to the sum of the nominal charge voltages of the plurality of storage batteries, the first, the second and the third switching means are controllable to electrically connect the storage batteries in series with each other, so as to recharge the series of storage batteries with a recharging voltage equal to the sum of the nominal charge voltages, wherein said plurality of storage batteries includes a first and a second storage battery (2a, 2b) having said nominal charge voltage and each provided with a positive terminal (2a', 2b') and a negative terminal (2a", 2b");

wherein said first switching means comprise: a first switch (12a) coupled between the positive terminal (2a') of the first storage battery (2a) and the positive voltage line (6a); a second switch (12b) connected between the negative terminal (2a") of the first storage battery (2a) and the negative voltage line (6b); a third switch (14a) coupled between the positive terminal (2b') of the second storage battery (2b) and the positive voltage line (6a); and a fourth switch (14b) coupled between the negative terminal (2b") of the second storage battery (2b) and the negative voltage line (6b);

wherein said second switching means comprise: a fifth switch (16a) coupled between the first power supply terminal (4a) and the positive terminal (2a') of the first storage battery (2a) and also coupled to the positive voltage line (6a) via said first switch (12a); and a sixth switch (16b) coupled between the second power supply terminal (4b) and the negative terminal (2b") of the second storage battery (2b) and further coupled to the negative voltage line (6b); and wherein said third switching means comprise a series switch (20) coupled between the negative terminal (2a") of the first storage battery (2a) and the positive terminal (2b') of the second storage battery (2b), in the first recharging mode of the battery pack (2), the first, the second, the third, the fourth, the fifth and the sixth switches (12a-16b) are controllable in conduction and said series switch (20) is controllable in interdiction, to recharge the first and second storage batteries with a recharging voltage equal to the nominal charge voltage; and, in the second recharging mode of the battery pack, the first, the second, the third and the fourth switches (12a-14b) are controllable in interdiction, while said fifth and sixth switches (16a, 16b) and said series switch (20) are controllable in conducting, so as to recharge the series of storage batteries with a recharging voltage higher than the nominal charge voltage.

5. The power supply and recharging assembly according to claim 4, further comprising an electronic control unit (51) operatively coupled to the first, the second and the third switching means, and configured to operate the first, the second and the third switching means to implement the first recharging mode and, alternatively, the second recharging mode of the battery pack.

6. The power supply and recharging assembly according to claim 5, wherein the electronic control unit (51) is further configured to:

acquire a maximum value for the recharging voltage deliverable by the recharging station;

implement the first battery pack recharging mode if the recharging voltage is lower than the sum of the nominal charge voltages of the plurality of storage batteries; and implement the second battery pack recharging mode if the recharging voltage deliverable by the recharging station is equal to or greater than the sum of the nominal charge voltages of the plurality of storage batteries.

7. The power supply and recharging assembly according to claim 4, wherein said series switch (20) has a first and a second conduction terminal directly connected to the negative terminal of the first storage battery and, respectively, to the positive terminal of the second storage battery, said first conduction terminal of said series switch (20) being coupled to the negative voltage line (6b) via the first switch (12b), and said second conduction terminal of said series switch (20) being coupled to the positive voltage line (6a) via the third switch (14a).

8. The power supply and recharging assembly according to claim 7, wherein:

in a vehicle key-off operating mode, the first, the second, the third, the fourth, the fifth and the sixth switches are controllable in interdiction, so that the battery pack (2) is disconnected from both the connector (4) and the power bus (6); and in a power delivery mode, the first, the second, the third and the fourth switches (12a-14b) are controllable in conduction state, while the fifth and the sixth switches (16a, 16b) and said series switch (20) are controllable in interdiction state, so that the battery pack (2) is connected to the power bus (6) to supply power to the power bus.

9. The power supply and recharging assembly according to claim 3, wherein said recharging voltage supplied by the recharging station is between 800V and 1000V, said storage batteries being chosen so that the sum of the respective nominal charge voltages is equal to or less than said recharging voltage.

10. The power supply and recharging assembly according to claim 9, wherein said plurality is two and the nominal charge voltage is 400V.

* * * * *